UNITED STATES PATENT OFFICE.

PAUL G. LEBRAM, OF BERLIN, GERMANY.

PROCESS OF PREPARING CARBONIC-ACID BATHS.

No. 897,546.      Specification of Letters Patent.      Patented Sept. 1, 1908.

Application filed November 6, 1907. Serial No. 400,975.

*To all whom it may concern:*

Be it known that I, PAUL G. LEBRAM, merchant, a subject of the King of Prussia, German Emperor, and a resident of Berlin, Germany, Friedrichstrasse 59/60, have invented certain new and useful Improvements in Processes of Preparing Carbonic-Acid Baths, of which the following is a full, clear, and exact specification.

This invention relates to a process for preparing carbonic acid baths, according to which esters of acids are used for the production of the carbonic acid (carbon dioxid) instead of the acids which were hitherto used notwithstanding the disadvantage of being more or less unhandy and often acting as caustic.

It has already been stated in literature, that the ethyl and methyl ester of formic acid are decomposed by the action of water. This decomposition is however practically useless for the purposes of artificial carbonic acid baths because of its slowness, even when bicarbonates are used. Now I have found, that a sufficient decomposition of bicarbonates may be effected by replacing formic acid esters of monovalent alcohols by the corresponding esters of multivalent alcohols. If for instance, the formic acid ester of mannite is added to an aqueous solution of a bicarbonate, said ester directly decomposes, forming formic acid and mannite, the former reacting with the bicarbonate and thus producing carbonic acid. The mannite ester of formic acid may be prepared by heating a mixture of formic acid or of oxalic acid and mannite.

For an ordinary bath there are taken 800 grams of bicarbonate and an equivalent quantity of formic acid ester. This latter quantity can be readily determined by the chemist and is variable according to the composition of the ester. The quantity of the ester depends upon how much of the alcohol rests is replaced by the rest of the formic acid.

According to the following formulas:

$$C_6H_8(OH)_5\text{-}HCOO$$

or $$C_6H_8(OH)_4\text{-}(COOH)_2$$

we obtain $$C_6H_8(COOH)_6.$$

I claim:

1. The process of preparing carbonic acid baths, consisting in adding a formic acid ester of multivalent alcohol to an aqueous solution of a bicarbonate, substantially as described.

2. The process of preparing carbonic acid baths, consisting in adding the mannite ester of formic acid to an aqueous solution of a bicarbonate, substantially as described.

PAUL G. LEBRAM.

Witnesses:
   HENRY HASPER,
   WOLDEMAR HAUPT.